No. 629,109. Patented July 18, 1899.
A. C. McCORD.
SPRING CUSHION.
(Application filed Oct. 17, 1898.)
(No Model.)
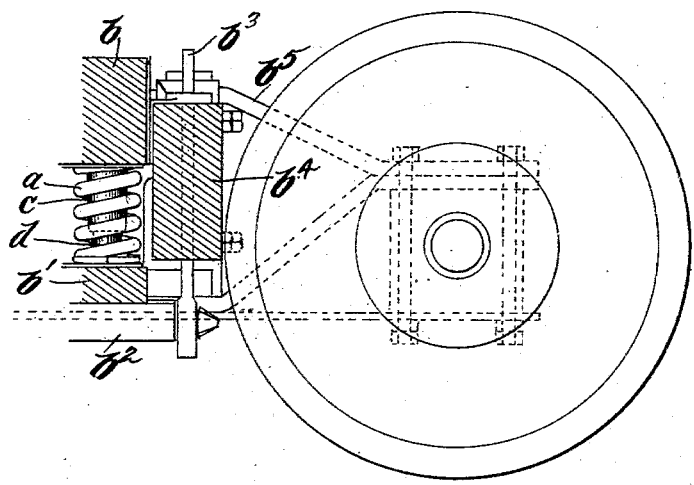
Fig. 1.
Fig. 2.
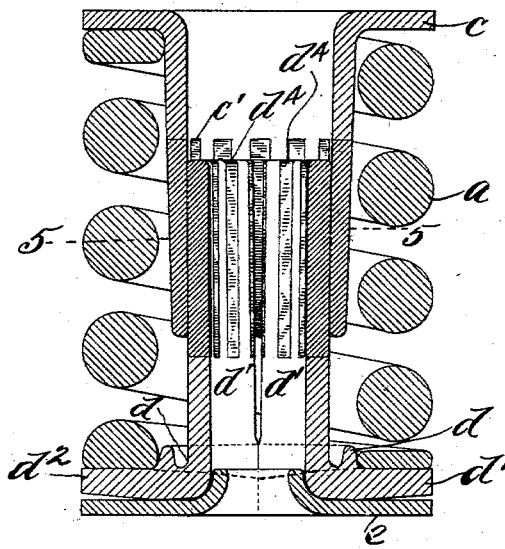
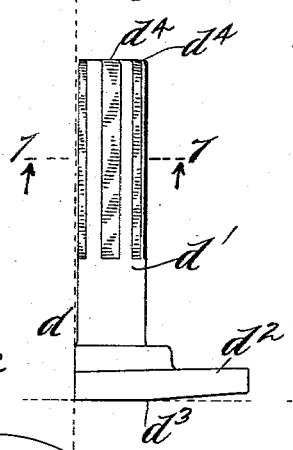
Fig. 3.
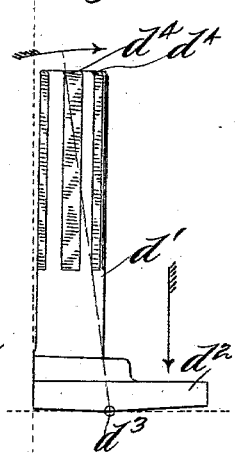
Fig. 4.
Fig. 5.
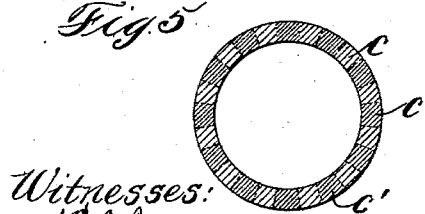
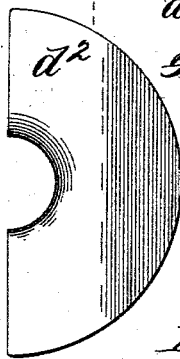
Fig. 6.
Fig. 7.
Witnesses:
Inventor:
Alvin C. McCord,
By Barton+Brown
Attorneys.

UNITED STATES PATENT OFFICE.

ALVIN C. McCORD, OF CHICAGO, ILLINOIS.

SPRING-CUSHION.

SPECIFICATION forming part of Letters Patent No. 629,109, dated July 18, 1899.

Application filed October 17, 1898. Serial No. 693,715. (No model.)

*To all whom it may concern:*

Be it known that I, ALVIN C. MCCORD, a citizen of the United States, residing at Chicago, in the county of Cook and State of Illinois, have invented a certain new and useful Improvement in Spring-Cushions, (Case No. 3,) of which the following is a full, clear, concise, and exact description.

My invention relates to spring-cushions primarily adapted for use in the construction of railway-vehicles.

The spring-cushion of my invention is particularly serviceable in connection with car trucks and buffers.

In the construction of car-trucks bolsters have been supported either upon coiled springs or upon elliptic springs. The elliptic springs possess an advantage over the coiled springs when the latter are unaccompanied by auxiliary devices, in that by their use each jolting movement of the car-truck will be accompanied by a single movement of the bolster, while with the coiled springs each jolting movement of the car-truck is accompanied by several movements of the bolster and the car-body mounted thereon. The elliptic springs, however, are much more expensive than the coiled springs and are of very much shorter life. Attempts have heretofore been made to associate auxiliary devices for dampening the vibrations of the coiled springs to produce substantially the same result as is secured by the more expensive elliptic springs. For this purpose frictional devices have been associated with coiled springs, the friction serving greatly to reduce the vibrations. In friction devices employed for this purpose means have been used for securing the frictional pressure totally independently of the coiled springs and of the parts between which the same are interposed.

It is the object of my invention greatly to simplify the construction of spring-cushions employing coiled springs and auxiliary friction devices and to make the frictional pressure between the elements of the friction devices associated with the coiled springs dependent upon the parts between which the spring-cushions are interposed and in the preferred embodiment of the invention to employ the coiled springs as a medium through which the cushioned parts operate to secure the required friction.

By means of my invention I am enabled practically to secure the results obtained by the use of elliptic springs and am at the same time enabled to produce a spring-cushion which is cheaper and which will last longer than the elliptic springs heretofore used. In the construction of trucks for supporting passenger-coaches, locomotives, and freight-cars for conveying delicate and perishable freight it is necessary that the jolting movements of the bolster be minimized, for which purpose elliptic springs have most generally been employed. I find that I am enabled to replace elliptic springs used in these various connections by the simpler and cheaper device of my construction, securing practically the same results.

Generally speaking, the invention comprises a spring-cushion interposed between relatively-movable parts—as, for example, the spring-plank and bolster of a truck—and a friction device operated by the said parts.

The invention in its preferred embodiment may generally be described as consisting of a friction-sleeve, a pair of flanged or bell-crank levers having arms extending within the bore of the sleeve, said sleeve and levers engaging the parts between which the spring-cushion is to be interposed, and a spring engaging the sleeve at one end and outwardly-extending arms of the levers at the other end, the spring serving to press the bell-crank levers into frictional engagement with the interior of the sleeve, either by transmitting the force of the weight or the force of the concussion to the levers.

By means of my invention the special means for maintaining frictional pressure between the elements of the friction device is dispensed with, this work being performed by the parts separated by the spring-cushion, the spring of the cushion in the preferred embodiment being employed to actuate friction-levers. As to the state of the art reference may be had to the patent granted to Dick and Luders August 13, 1878, No. 207,020.

I will explain my invention more particularly by reference to the accompanying drawings, in which—

Figure 1 is a side view of a portion of a swing-motion truck with the device of my invention in place. Fig. 2 is a sectional view of a spring-cushion constructed in accordance with my invention. Fig. 3 is an elevation of one of the friction-levers. Fig. 4 is a similar view with the friction-lever rocked upon its pivot in the position it might assume when frictionally engaging the sleeve. Fig. 5 is a sectional view of the sleeve on line 5 5 of Fig. 2. Fig. 6 is a bottom view of one of the friction-levers. Fig. 7 is a sectional view on line 7 7 of Fig. 3.

Like letters indicate like parts throughout the different figures.

In Fig. 1 I have illustrated my invention as being applied to a well-known swing-motion diamond freight-car truck. The invention, however, is capable of use with other forms of car-trucks and for other purposes. I have shown but one spring $a$ of a group, which is interposed between the bolster $b$ and spring-plank $b'$. As the construction and arrangement of the spring-plank bearing $b^2$, column-bolt $b^3$, column guide or transom $b^4$, and the arch-bars $b^5$ are well known to those skilled in the art, I do not deem further mention thereof to be essential. The spring is preferably constructed of round bar-steel flattened at each end, the spring being in the form of a spiral. I preferably employ as one friction element a sleeve $c$, which is preferably surrounded by the spring. For the other friction element I preferably employ two flanged or bell-crank friction-levers $d\ d$, which are preferably opposed, each having an arm $d'$, extending within the sleeve, and a second arm $d^2$, engaged at its outer portion or periphery by one end of the spring. The latter arms are shaped as shown most clearly in Figs. 2, 3, 4, and 6. The arms of the levers extending within the sleeve are semicircular in cross-section, as shown in Fig. 7, the levers when assembled forming a longitudinally-split tube, the arms $d^2$ forming a flange to the tube. I preferably provide a lever-plate $e$, upon which to rest the arms $d^2$. The faces of the arms $d^2$ that engage the lever-plate are cut away, as shown most clearly in Figs. 3 and 4, to provide fulcra $d^3$, about which the friction-levers may be rocked. Those portions of the arms $d^2$ that engage the spring $a$ are preferably inclined from the periphery toward the center, so that the spring will only engage the arms at the periphery when the levers are unexpanded, so that upon the application of force to the springs the friction-levers may be rocked and brought into engagement with the friction-sleeve. The lever-plate is mounted in the application of the invention shown in Fig. 1 upon the spring-plank, and the sleeve is fastened to the bolster, the sleeve being preferably flanged at its upper end. The friction elements $d'\ d'\ c$ are each preferably provided with chilled inserts $d^4\ d^4\ c'$ to increase the durability of these parts. The inserts carried by the levers are adapted frictionally to engage the inserts in the sleeve.

While I have illustrated the spring-cushion of my invention as being disposed between the bolster and spring-plank of a car-truck, it is obvious that it may be disposed between other parts whose relative movement is to be retarded or to reduce the number of vibrations.

It will be observed that the coiled spring $a$ performs the double function of cushioning the separated parts and of transmitting to the friction-levers any force impressed upon the coiled spring by the separated parts. Thus the coiled spring upon its compression is the means of securing frictional pressure between the elements of the friction device, as the elliptic spring is capable of producing friction between its component plates. The frictional pressure varies with the load or pressure upon the spring.

It will be apparent that by means of my invention no auxiliary devices need be employed for securing frictional pressure between the elements of the friction device, the separated parts being adapted to furnish the necessary force, while in the preferred embodiment the coiled spring of the cushion is employed to transmit the force to frictionally engage the elements of the friction device.

When the device of my invention is employed in car-trucks, the coiled spring is constantly under pressure, whereby the frictional elements are constantly maintained in engagement, the frictional pressure varying according to the degree of compression of the spring. In Figs. 1 and 2 the spring is shown as being distended nearly to its full limit. While I have illustrated the sleeve $c$ as being provided with a flange, it is obvious that other means may be employed for securing an engagement between the sleeve and the spring.

It is obvious that changes may be made in my improved spring-cushion without departing from the spirit of my invention, and I do not, therefore, desire to be limited to the precise construction shown; but,

Having thus described my invention, what I claim as new, and desire to secure by Letters Patent, is—

1. The combination with the coiled spring $a$, of the sleeve and friction-levers, the pressure of the spring acting upon the said friction-levers to cause frictional pressure varying with the load against the sleeve, substantially as described.

2. The combination with the coiled spring $a$, of a friction element and friction-lever mechanism, the pressure of the spring acting upon the said friction-lever mechanism to cause frictional pressure varying with the load against the friction element, substantially as described.

3. The combination with the coiled spring $a$, of a sleeve $c$ surrounded by the spring, and friction-levers $d\ d$ extending within the sleeve and engaged by the spring, the pressure of the spring acting upon said levers to cause frictional pressure varying with the load against the interior of the sleeve, substantially as described.

4. The combination with the coiled spring $a$, of a sleeve $c$ surrounded by the spring, and opposed friction bell-crank levers $d\ d$, an arm of each of which extends within the sleeve, the remaining arm of each lever being engaged by the spring, the pressure of the spring acting upon said levers to cause frictional pressure varying with the load against the interior of the sleeve, substantially as described.

5. A spring-cushion comprising a sleeve, a lever-plate, flanged levers carried upon the lever-plate, the said levers and sleeve having frictional engaging surfaces, and a coiled spring interposed between and engaging the sleeve and levers which causes the latter frictionally to engage the sleeve, substantially as described.

6. A spring-cushion comprising a flanged sleeve, a lever-plate, bell-crank levers pivotally supported upon the lever-plate, an arm of each of said levers extending within the sleeve, the arms within the sleeve being capable of outward expansion and of frictional engagement with the interior of the sleeve, and a coiled spring interposed between the remaining arms of the levers and the flange of the sleeve, which spring serves to cause the arms within the sleeve to expand and frictionally engage the interior of the sleeve, substantially as described.

7. In a spring-cushion, the combination with a friction element $c$, of a lever adapted for frictional engagement therewith, and a coiled spring engaging and interposed between the lever and said friction element and serving frictionally to engage said lever and friction element, substantially as described.

8. In a spring-cushion, the combination with a friction element $c$, of a bell-crank lever, one of whose arms is adapted for frictional engagement with said friction element, and a coiled spring interposed between the remaining arm of the lever and said friction element and serving frictionally to engage said lever and friction element, substantially as described.

9. In a spring-cushion, the combination with a coiled spring interposed between the parts to be cushioned, of a friction element, and a lever engaged by the spring and thereby brought into frictional engagement with the friction element, substantially as described.

10. In a spring-cushion, the combination with a coiled spring interposed between the parts to be cushioned, of a friction element, and a bell-crank lever, said lever having one arm engaged by said spring and its remaining arm forced into frictional engagement with said friction element by said spring, substantially as described.

11. In a spring-cushion, the combination with a coiled spring interposed between the parts to be cushioned, of a friction bell-crank lever frictionally engaging or adapted frictionally to engage a surface, said friction-lever being engaged by the spring for its operation, substantially as described.

12. In a spring-cushion, the combination with a coiled spring interposed between the parts to be cushioned, of a friction-lever frictionally engaging or adapted to engage a surface, said friction-lever being adapted to be operated by said spring, substantially as described.

13. In a spring-cushion, the combination with a coiled spring interposed between the parts to be cushioned, of a friction bell-crank lever frictionally engaging or adapted frictionally to engage a surface, one arm of the lever extending within the bore of the spring the remaining arm being engaged by the spring to operate the friction-lever, substantially as described.

14. In a spring-cushion, the combination with a spring interposed between the parts to be cushioned, of a friction-lever frictionally engaging or adapted to engage a surface, said friction-lever being adapted to be operated by said spring, substantially as described.

In witness whereof I hereunto subscribe my name this 13th day of October, A. D. 1898.

ALVIN C. McCORD.

Witnesses:
A. L. LAWRENCE,
GEORGE L. CRAGG.